United States Patent [19]

Röhm

[11] Patent Number: 4,493,242
[45] Date of Patent: Jan. 15, 1985

[54] ACTUATOR FOR POWER CHUCK

[76] Inventor: Günter H. Röhm, Heinrich-Röhm-Str. 50, 7927 Sontheim, Fed. Rep. of Germany

[21] Appl. No.: 374,879

[22] Filed: May 4, 1982

[30] Foreign Application Priority Data

May 6, 1981 [DE] Fed. Rep. of Germany ....... 3117850

[51] Int. Cl.³ ............................................. F01B 31/12
[52] U.S. Cl. ............................................ 91/1; 91/420; 91/422; 92/5 R; 92/106; 279/4; 82/28 R
[58] Field of Search ............... 91/1, 420, 422; 92/5 R, 92/2, 5 L, 106; 279/4; 82/28 R, 30; 116/282; 308/176; 200/47, 50 R, 82 R

[56] References Cited

U.S. PATENT DOCUMENTS

| | | | |
|---|---|---|---|
| 3,352,322 | 11/1967 | Strick | 91/1 |
| 3,641,875 | 2/1972 | Kodalle | 91/1 |
| 4,007,943 | 2/1977 | Scharfen et al. | 279/4 |
| 4,249,451 | 2/1981 | Le Moal | 91/1 |

FOREIGN PATENT DOCUMENTS 142854 7/1980 Fed. Rep. of Germany .......... 279/4

*Primary Examiner*—Robert E. Garrett
*Assistant Examiner*—Richard S. Meyer
*Attorney, Agent, or Firm*—Karl F. Ross; Herbert Dubno

[57] ABSTRACT

A chuck actuator has a cylinder extending along a main axis and a piston axially displaceable in the cylinder, forming therein two compartments, and having an axially backwardly extending stem also centered on the axis and formed with two respective intake passages each having one end opening into the respective compartment and another end opening at a respective location on the stem. A connector rotatable about the axis on the stem is provided with respective fittings communicating with the locations. First and second axially spaced bearings prevent the connector from moving axially on the stem. Fluid is fed under pressure alternately to the fittings to pressurize and depressurize the respective compartments and thereby axially displace the piston in the cylinder. Normally the cylinder is connected to a chuck body and the piston to a chuck-actuating member for fluid actuation of the member. An axially extending guide fixed on the connector slidably receives an axially extending bar slidable and a third bearing distinct from the first and second bearings links the bar to the cylinder for joint axial movement therewith but rotation relative thereto. A sensor including at least one element carried on the bar and another element on the connector adjacent the guide and engageable with the one element in a predetermined axial position thereof relative to the connector detects when the elements are in the predetermined position.

10 Claims, 4 Drawing Figures

4,493,242

ACTUATOR FOR POWER CHUCK

FIELD OF THE INVENTION

The present invention relates to an actuator for a power chuck. More particularly this invention concerns such an actuator which is used to hydraulically operate the clamping element of a power chuck, which term is intended to include a power mandrel or other such holding device carried on a rotatable support such as a lathe headstock.

BACKGROUND OF THE INVENTION

A power chuck or mandrel such as described in my numerous earlier patents has a chuck or mandrel body centered on and rotatable about the axis of a headstock on which it is mounted. Normally jaws or similarly effective elements on the chuck body can be displaced radially by axial displacement of a central operating member. In a standard chuck this operating member may have a plurality of hooks with inclined faces that engage oppositely inclined faces of the jaws so that displacement of the hooks cams the jaws radially in or out depending on the axial displacement direction. In a power mandrel such as described in my copending application 370,957 filed April 22, 1982 the operating member is a piston which pressurizes the interior of an outwardly swellable sleeve that engages the inner surface of a tubular workpiece or of a bore in a workpiece or tool.

Commonly owned U.S. Pat. No. 3,641,875, which is roughly the equivalent of German Pat. No. 1,911,558 of Rudi Kodalle, describes a classic hydraulic or pneumatic actuator. In this arrangement the cylinder extends along a main axis and contains an axially displaceable piston that forms two compartments in the cylinder. The piston has an axially backwardly extending stem also centered on the axis and formed with respective intake passages each having one end opening into a respective one of the compartments and another end opening at a respective location on the stem. A connector is rotatable about the axis on the stem and is provided with respective fittings communicating with the locations. Bearings prevent the connector from moving axially on the stem.

Fluid can be fed under pressure alternately to the fittings to pressurize and depressurize the respective compartments and thereby axially displace the piston in the cylinder so that the cylinder can be connected to a chuck body and the piston to a chuck-actuating member for fluid actuation of the member. A double check valve arrangement is built right into the piston for inhibiting flow out of either of the compartments unless one of the passages is pressurized.

In this arrangement coacting sensor elements, normally a switch and a cam, are provided, one carried by and therefore axially linked to the piston and the other fixed to a stationary support. The switch is normally provided on the support at such a position that it is actuated when the piston reaches one end position. Another switch and/or cam may be provided for the other end position, so that an automatic controller will know when the operating member linked to the piston has reached an end position. This information is useful since the piston can normally only move into an end position when the jaws or the like it controls are not properly engaged with the workpiece or tool. Thus when this end position is reached the operator can be automatically signaled that something has gone wrong.

Such an arrangement is relatively simple since the connector which is also known as the distributor is normally fixed against rotation and therefore only moves slightly axially relative to the support. The device is disadvantageous in that it is relatively bulky. Furthermore it cannot be counted on to give an accurate response, unless the device is meticulously calibrated each time it is used. As there is frequently a slight shifting of the chuck to which the cylinder is secured, so that this displacement, depending on its direction, is added to or subtracted from the actual piston displacement.

OBJECTS OF THE INVENTION

It is therefore an object of the present invention to provide an improved actuator.

Another object is the provision of such an actuator which overcomes the above-given disadvantages.

Yet another object is to provide such an actuator which accurately reads the relative position of piston and cylinder, and which is relatively compact.

SUMMARY OF THE INVENTION

These objects are attained according to the instant invention in a chuck of the above-described type, that is having a cylinder extending along a main axis and containing a piston axially displaceable in the cylinder and forming therein two compartments. The piston has an axially backwardly extending stem also centered on the axis and formed with respective intake passages each having one end opening into a respective one of the compartments and another end opening at a respective location on the stem. A connector is rotatable about the axis on the stem and is provided with respective fittings communicating with the locations. Bearings prevent the connector from moving axially on the stem. Fluid can be fed under pressure alternately to the fittings to pressurize and depressurize the respective compartments and thereby axially displace the piston in the cylinder so that the cylinder can be connected to a chuck body and the piston to a chuck-actuating member for fluid actuation of the member. A double check valve arrangement is built right into the piston for inhibiting flow out of either of the compartments unless one of the passages is pressurized.

According to this invention an axially extending guide on the connector slidably receives an axially extending bar. Means including a bearing links the bar to the cylinder for joint axial but relative rotational movement therewith. In addition sensor means including at least one element carried on the bar and another element on the distributor adjacent the guide and engageable with the one element detects when the elements are in a predetermined axial position relative to each other.

Thus with the system of this invention there is no need to mount the switch element of the sensor means on a fixed support. Instead the entire arrangement is mounted between the two axially relatively shiftable parts of the actuator. This type of construction makes the device quite compact. Furthermore the relative position of the piston and cylinder is sensed, not that of the piston relative to a fixed support, so that the device will respond quite accurately. The sensor means is part of the actuator itself, so that it need not be separately mounted and calibrated if this actuator is changed. Instead the electrical connections need merely be pulled off the switch terminals and pushed onto the switch terminals of the new actuator. No complex recalibration is required each time the chuck assembly must be taken down for whatever reason.

The linking means according to this invention is a roller bearing centered on the axis and having an inner race fixed on the cylinder and an outer race fixed to the bar. It may also be rotatable about a transverse axis radial of the main axis, in which case the cylinder is formed with a radially outwardly open groove having axially confronting flanks loosely axially flanking the bearing of the linking means. In this manner the cylinder can rotate with the chuck relative to the bar, but will be fixed axially to it so the bar will follow the tiniest axial movement of the cylinder.

According to another feature of this invention the cylinder has a backwardly extending neck surrounding the stem and engaging the bearing of the linking means. This neck carries the bearing of the linking means and may be formed with the above-described outwardly open groove.

Normally the guide is fixed to the distributor and is formed with an axially extending groove receiving the bar. In addition the guide is provided with a radially outwardly extending arm carrying the other element of the sensor means. Thus the one element, normally the cam, of the sensor means lies between the other element, normally a microswitch, and the bar. The groove and bar are of generally complementary cross section and have juxtaposed outer surfaces lying on planes parallel to the axis.

According to another feature of this invention the guide is provided with roller-bearing elements between the juxtaposed outer surfaces. Thus the bar will move easily axially in the guide, but will not be able to move radially at all therein. Perfect interaction of the cam and switch is ensured.

DESCRIPTION OF THE DRAWING

The above and other features and advantages will become more readily apparent from the following, reference being made to the accompanying drawing in which.

SPECIFIC DESCRIPTION

Figure 1:
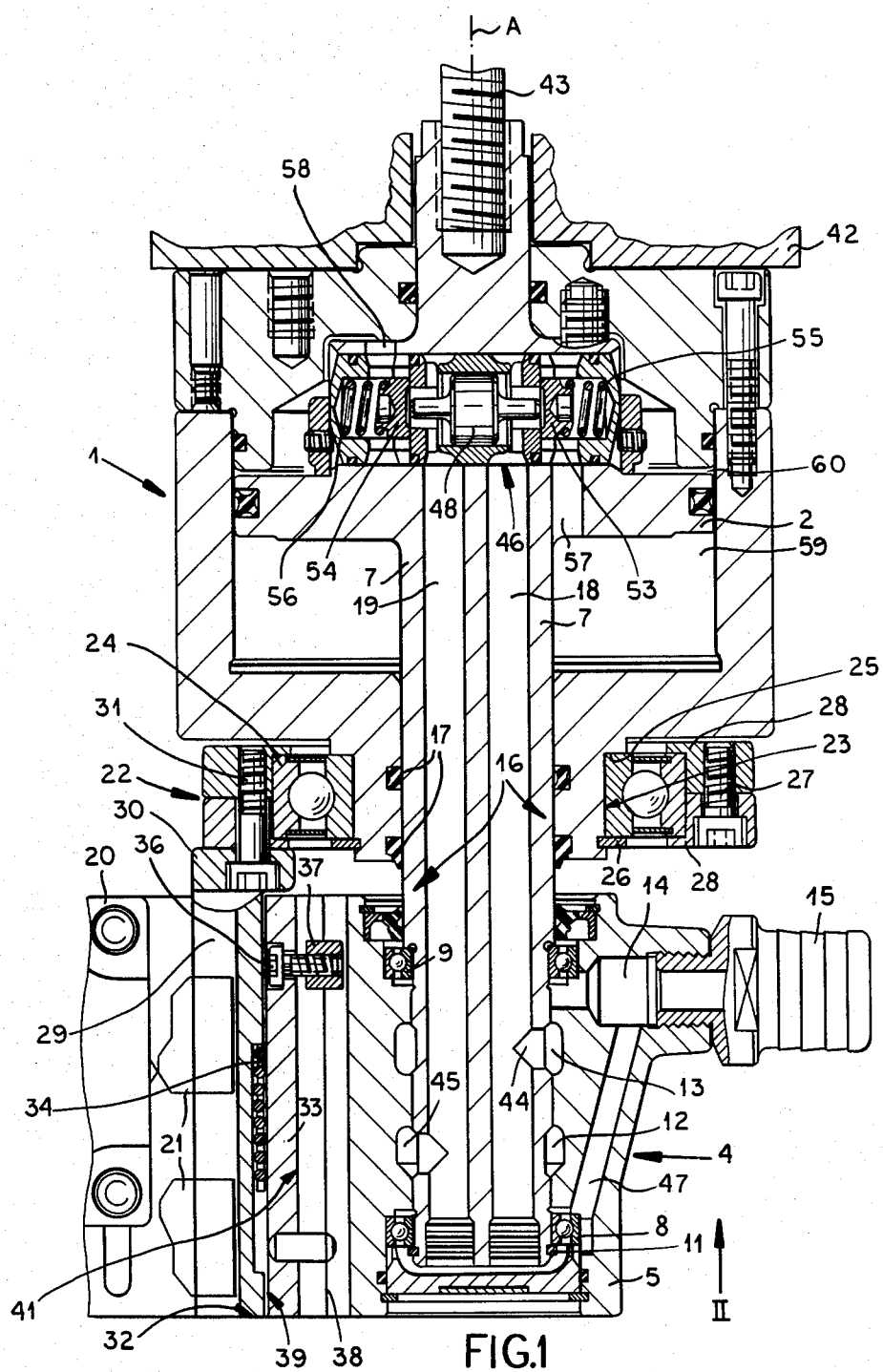
FIG. 1 is an axial section through an actuator according to this invention.
Figure 2:
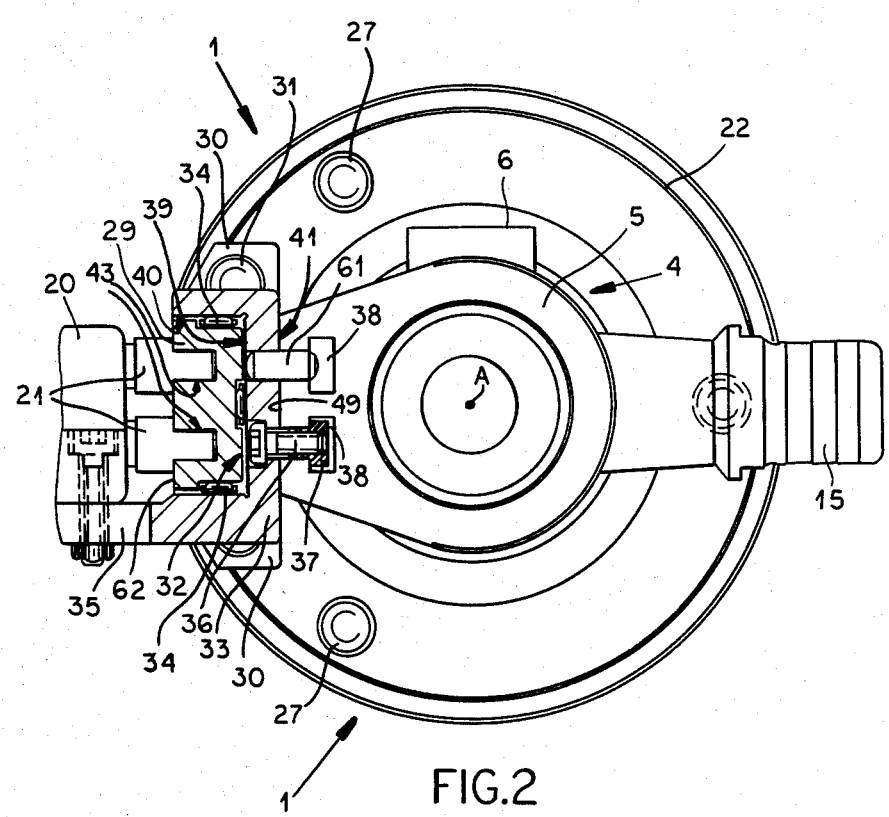
FIG. 2 is an end view taken in the direction of arrow II of FIG. 1.

As seen in FIGS. 1 and 2 a chuck or mandrel actuator is centered on and rotatable about an axis A and basically consists of a cylinder 1, a piston 2 axially reciprocal in the cylinder 1, and a connector 4 carried on a rearwardly axially projecting stem 7 of the piston 2 and rotatable relative thereto. The cylinder 1 and piston 2 normally rotate jointly. The cylinder 1 is normally bolted to a chuck or mandrel 42 having a bolt or actuation element 43 screwed into an axially centered bore at the front end of the piston 2 so that relative axial movement of the cylinder 1 and piston 2 will axially displace the operating element 43 in the chuck 42. This is effected by feeding fluid under pressure to either of two connections 6 (one shown in FIG. 2) of the body 5 of the connector 4.

The connector body 5 is secured against axial displacement on the stem 7 by roller bearings 8 and 9, the latter engaged against a shoulder 10 of the stem 7 and the former against a snap ring 11 clipped to it. Thus this connector body 5 can rotate freely on the stem 7 but cannot move axially relative to it. In addition the body 5 is formed with two inwardly open annular passages 12 and 13 communicating with the respective connections 6 and level with radially outwardly open bores 44 and 45 that open into passages 18 and 19 that extend axially through the piston 2 from the openings or bores 44 and 45 to a complex double check valve arrangement 46. A normally downwardly directed drain 14 having a hose fitting 15 opens at the interface between the outer surface of the stem 7 and the inner surface of the annular connector body 5 to both sides of the passages 12 and 13. Thus any leakage will be trapped and drained off. Several O-ring seals 17 are provided at 16 between the a neck extension 23 of the cylinder and the stem 7 at this location to prevent leakage between the stem 7 and the cylinder 1.

The double check valve 46 has a piston 48 whose one face is exposed to the pressure in the passage 18 and whose other face is exposed to the pressure of the passage 19. A pair of one-way check valve bodies 53 and 54 flank the piston 48 and are urged by respective springs 55 and 56 into engagement with respective seats so that, when the piston 48 is equispaced between the two valve bodies 53 and 54, there can be no flow out of respective passages 57 and 58 that open into the compartments 59 and 60 that flank the piston 2 in the cylinder 1.

The purpose of this double check valve 46 is to prevent depressurization of either compartment 59 or 60 of the unit unless the fitting 6 of the other compartment is pressurized. Thus if pressure fails at both of these fittings, the piston 48 will move into its central position and flow out of both compartments 59 and 60 will be blocked by the respective valve bodies 53 and 54, thereby locking up the device. It therefore is possible to appropriately pressurize the device, then cut off all pressure feed whatsoever, enough to completely depressurize the passages 18 and 19, so as to eliminate any likelihood of leakage at the rotating joint between the connector 4 and the piston stem 7.

In order to ascertain the relative positions of the piston 2 and cylinder 1 appropriate switch means 20, 21 is provided comprising one part or parts, here cams 21, axially coupled to the cylinder 1 and another part or parts, here microswitches 20, axially coupled to the piston 2.

More specifically two concentric rings 22 are secured together by bolts 27 and by a bolt 31 to a flange 30 of an axially extending support bar 29 to which the two cams 21 are fixed. The two rings 22 grip the outer race of a ball bearing 24 whose inner race is engaged on the neck 23 of the cylinder 1 between a shoulder 25 and a snap ring 26 thereof. The two rings 22 have lips 28 that embrace the outer race of the bearing 24 so that the cams 21 are fixed axially to the cylinder 1, but can move relative thereto about the axis A freely.

The switches 20 are fixed on an arm 35 of a square U-shaped guide 33 fixed to the connector body 5. To this end the connector body 5 has a planar face 49 against which a flat side 41 of the guide 33 engages and at which open two axially extending and parallel T-slots 38. A centering pin 61 slides in one of the slots 38 and a nut 37 of a screw 36 in the other, so that the axial position of this element 33 on the body 5 can be adjusted and firmly locked in place.

The guide 33 has a pair of side flanks 40 and a base flank 39 perpendicular thereto and engaging respective faces 62 and 32 of the guide bar 29, which FIG. 2 shows as having two axially extending grooves 43 in which the respective cams 21 are fixed. Arrays of needle bearings 34 lie between the flanks 32 and 39 and between each of the flanks 40 and the respective flank 62 so that the bar 29 can slide easily in the guide 33. The switches 20 will therefore be relatively stationary, only moving axially slightly with the chuck 42. The planes of the surfaces 32, 39, 40, and 62 are perfectly parallel to the axis A for perfect axial travel of the guide 29. The relative position of the cams 21 with respect to the switches 20 is adjusted so that when the chuck jaws or similar elements move into one end position one of the switches 20 will be actuated, and when in the other end position the other switch 20 is actuated.

The use of the needle bearings 34 between the guide bar 29 and guide 33 insures that the cams and switches 20 and 21 will always coact perfectly. Even if the chuck 42 is rotating relatively rapidly, these two parts will be stock-still relative to each other, so long as the piston 2 is not moving in the cylinder 1.

Figure 3:
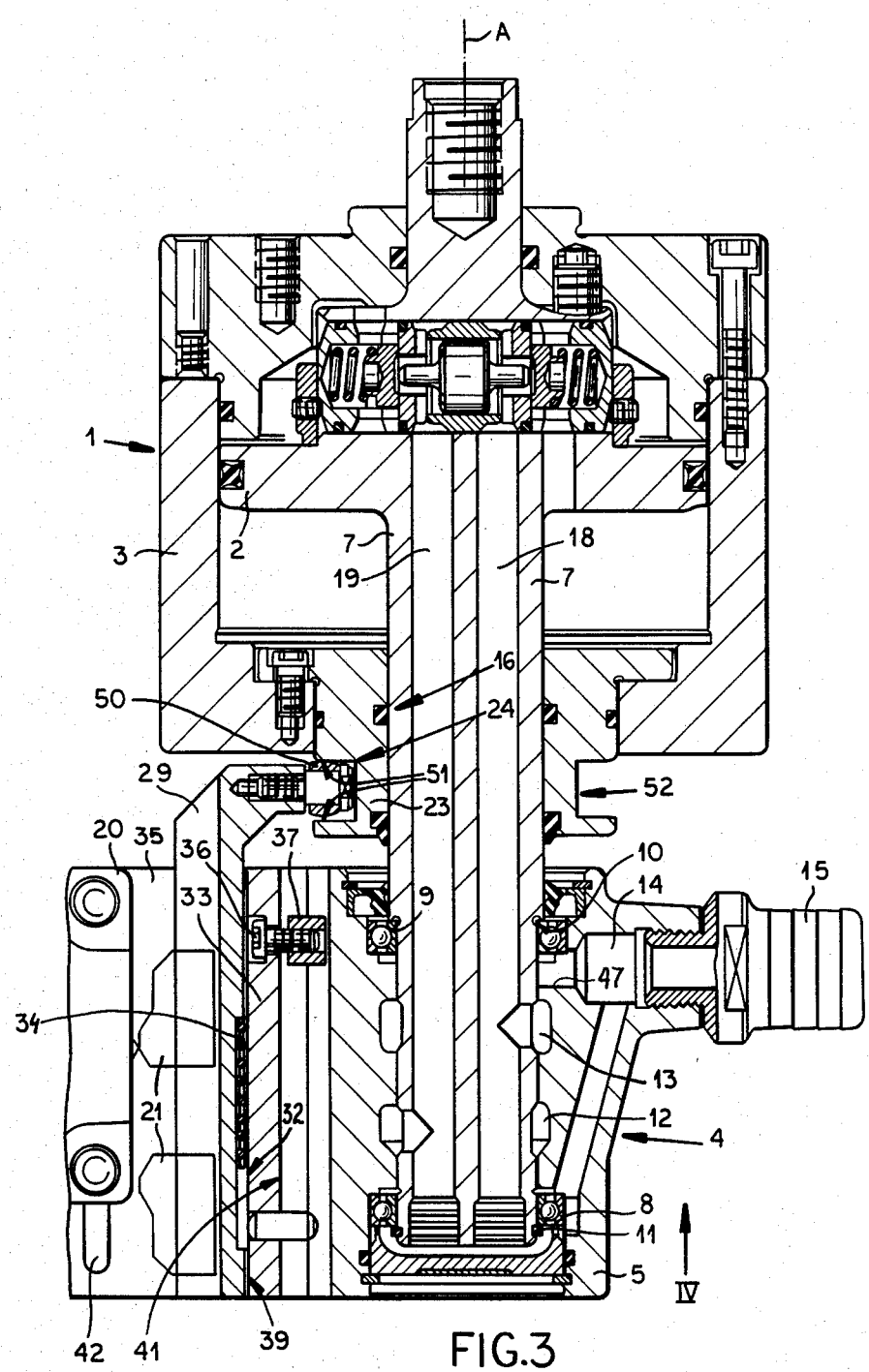
FIG. 3 is an axial section through another actuator according to this invention.
Figure 4:
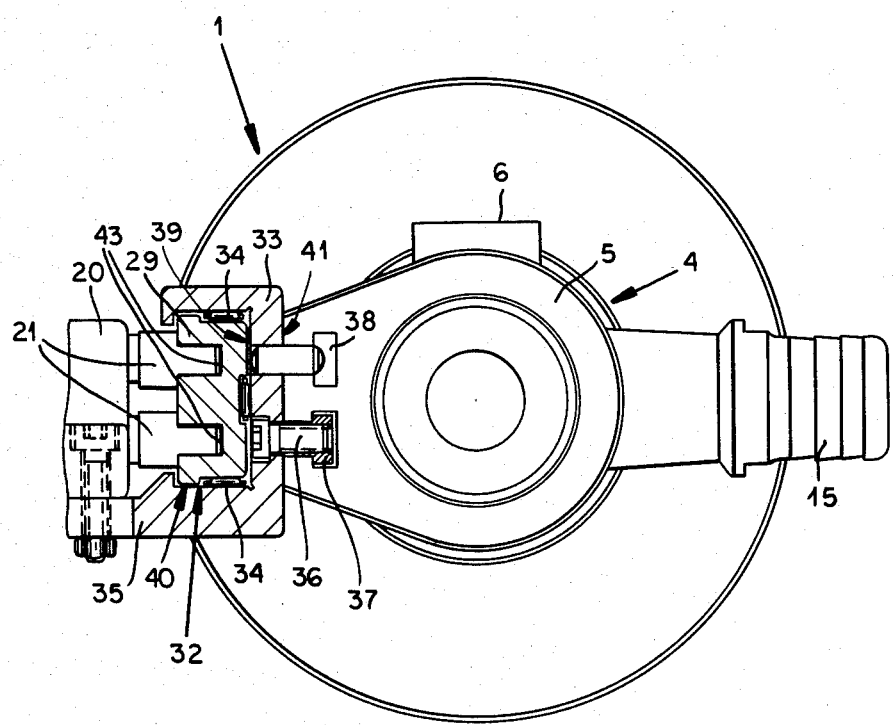
FIG. 4 is an end view taken in the direction of arrow IV of FIG. 3.

In addition as shown in FIGS. 3 and 4 it is possible for the guide bar 29 to simply have an extension carrying a roller 50 rotatable about an axis perpendicular to the axis A and fitting snugly between the flanks 51 of a square-section groove 52 formed in the neck 23. Thus this arrangement also insures perfect axial linking of the cams 21 and cylinder 2 while allowing them to rotate freely relative to each other.

I claim:

1. A chuck actuator comprising:
  a cylinder extending along a main axis;
  a piston axially displaceable in said cylinder and forming therein two compartments, said piston having an axially backwardly extending stem also centered on said axis and formed with two respective intake passages each having one end opening into the respective compartment and another end opening at a respective location on said stem;
  a connector rotatable about said axis on said stem and provided with respective fittings communicating with said locations;
  means including first and second axially spaced bearings for preventing said connector from moving axially on said stem;
  means for feeding fluid under pressure alternately to said fittings to pressurize and depressurize the respective compartments and thereby axially displace said piston in said cylinder, whereby said cylinder is connected to a chuck body and said piston to a chuck-actuating member for fluid actuation of said member;
  an axially extending guide fixed on said connector;
  an axially extending bar slidable axially in said guide;
  means including a third bearing distinct from the first and second bearings for linking said bar to said cylinder for joint axial movement therewith but rotation relative thereto; and
  sensor means including at least one element carried on said bar and another element on said connector adjacent said guide and engageable with said one element in a predetermined axial position thereof relative to said connector for detecting when said elements are in said predetermined position.

2. The actuator defined in claim 1 wherein said bearing of the linking means is a roller bearing centered on said axis having an inner race fixed on said cylinder and an outer race fixed to said bar.

3. The actuator defined in claim 1 wherein said bearing of the linking means is rotatable about a transverse axis radial of said main axis, said cylinder being formed with a radially outwardly open groove having axially confronting flanks loosely axially flanking said bearing of said linking means.

4. The actuator defined in claim 1 wherein said cylinder has a backwardly extending neck surrounding said stem and engaging said bearing of the linking means.

5. The actuator defined in claim 1 wherein said guide is fixed to said connector and is formed with an axially extending groove receiving said bar.

6. The actuator defined in claim 5 wherein said guide is provided with a radially outwardly extending arm carrying said other element of said sensor means.

7. The actuator defined in claim 5 wherein said one element of said sensor means lies between said other element and said bar.

8. The actuator defined in claim 5 wherein said groove and bar are of generally complementary cross section and have juxtaposed outer surfaces lying on planes parallel to said axis.

9. The actuator defined in claim 8 wherein said guide is provided with roller-bearing elements between said juxtaposed outer surfaces.

10. The actuator defined in claim 1, further comprising means including a double check valve in said piston at said passages for inhibiting flow out of either of said compartments unless one of said passages is pressurized.

* * * * *